United States Patent

[11] 3,576,399

[72] Inventors Hans Schweitzer
Bietigheim;
Helmut Willrett, Ditzingen, Germany
[21] Appl. No. 696,524
[22] Filed Jan. 9, 1968
[45] Patented Apr. 27, 1971
[73] Assignee International Standard Electric Corporation
New York, N.Y.
[32] Priority Jan. 25, 1967
[33] Germany
[31] ST26407

[54] SCANNING MEANS FOR CENTRAL-CONTROLLED SWITCHING SYSTEMS
3 Claims, 2 Drawing Figs.

[52] U.S. Cl. .......... 179/18
[51] Int. Cl. .......... H04m 3/22
[50] Field of Search .......... 179/18.6 (A), 18.9, 18.3 (C)

[56] References Cited

OTHER REFERENCES

A. Feiner and L. F. Aoeller Jr., " A High-Speed Line Scanner For Use in An Electronic Switching System," Bell System Technical Journal, Volume 37 Nov. 1958, pp 1383—1403

*Primary Examiner*—Kathleen H. Claffy
*Assistant Examiner*—Randall P. Myers
*Attorneys*—C. Cornell Remsen, Jr., Rayson P. Morris, Percy P. Lantzy, J. Warren Whitesel and Delbert P. Warner

ABSTRACT: A last look scanning technique is used to detect changes occurring on a line. To avoid a continuous report of "no change" to a centralized data processor, a decentralized detector looks at each line during the appropriate scan time slot. Only if there is a change does the decentralized detector communicate with the central processing equipment.

PRIOR ART SYSTEM

SCANNING MEANS FOR CENTRAL-CONTROLLED SWITCHING SYSTEMS

Figure 1:
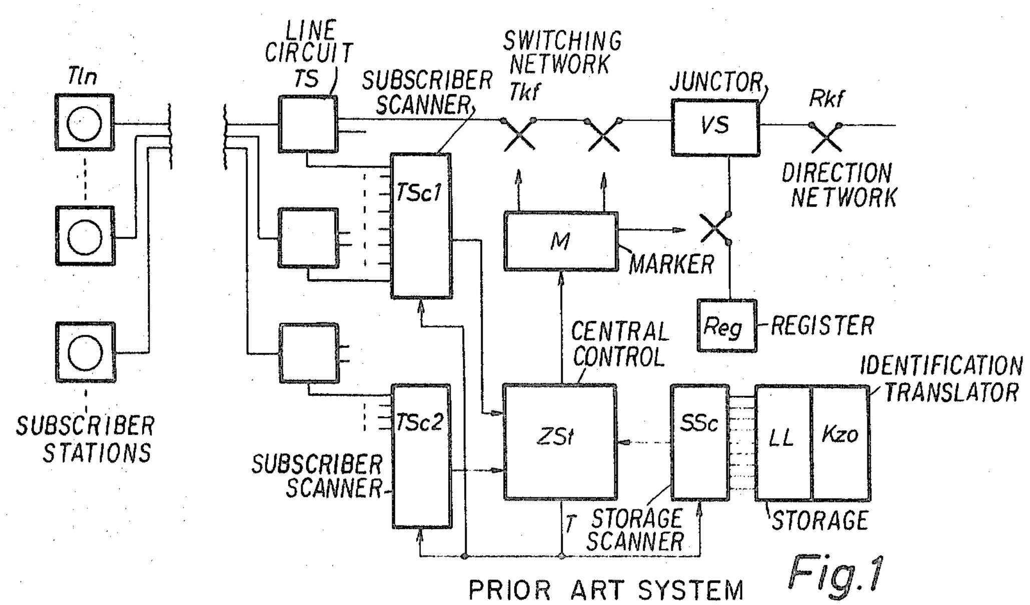

The invention relates to scanning means for central-controlled telecommunication exchange systems and more particularly to systems in which the subscriber circuits are interrogated cyclically on the momentary condition of the subscriber loop.

One storage element is simultaneously interrogated on the condition prevailing during the previous interrogation and it is also set into the momentary condition which is then prevailing. In case of a change, there is an indication that a control process should be initiated. Such a mode of operation is called a "last look" method. Such exchange systems are known, e.g. from the article "A High-Speed Line Scanner for Use in an Electronic Switching System" by A. Feiner and L. Goller, published in the periodical "Bell System Technical Journal," Nov. 1958.

In the known arrangements, there are centrally arranged elements for storing the conditions during the previous interrogation. This has the advantage that these storage elements can be arranged in common with other storage elements—such as an identification translator in a central control. There, existing writing and reading means can be used for this purpose.

Usually, a separate scanning means tests the subscriber circuits and transfers the results of each scanning cycle to the central control where it is compared with the result of the previous interrogation. In case of a change, processes are initiated in the control, as for example by an establishing or release of connections. Thus, the known arrangements provide an advantage since only one comparing means is required per exchange, and it can directly initiate a control process. In the known arrangements a very high scanning frequency must be used as the mentioned publication already indicates, in order to quickly recognize all changes at all subscribers in the time multiple.

In order to recognize relatively short dialling signals, the scanning frequency may be increased to be above that of the received dial signals. However, this requires a considerable expenditure of switching means not specified in the above mentioned article.

In any case, it is expensive to provide equipment with the operating speed required by centralized last look control means. Moreover, the comparing result furnished is very monotonous since the indication usually is "no change occurred." The operating speed of the comparing means is not only determined by the duration of the conditions of the subscriber loops, but also by the randomness at which signals appear; whereas scanning is in a fixed cycle. An object of the present invention to avoid a redundant flux of information from the scanning means to the central control, which merely reports "no change." Consequently, an object is to reduce the required operating speed.

According to the invention, the scanning means is characterized in this that separate sensor and storage matrices are provided for storing the condition during the previous interrogation. Comparing means and logical circuits are associated with the subscriber circuits. These decentralized detector means transfer an item of information to the central control means, only if the detector finds a change of the coop condition, on the subscriber line. The scanning means avoids the above described disadvantages of the known arrangements. Shorter lines of memory cells in this scanning means are the result of using scanning pulses in the microsecond range.

This advantage is of particular importance, if the sensor matrix, the storage matrix, and the comparing means are in a subexchange, preceding a main exchange, while the central control for processing the reported changes are in the main exchange. Both matrices can be actuated simultaneously with the same interrogating means. Moreover, if in the hitherto known circuits the sensor for loop interruption in the subscriber circuit is somewhat more sensitive than the sensor for the dial pulse receiving device in the junctor or in the register, then the first sensor in the subscriber circuit still responds at a defined current, which may be at inadmissibly high leakage. The sensor in the junctor of the register on the other hand might not recognize a calling condition, and it would then release the connection again. Unless it is prevented, this play between sensor demand and junctor release can be repeated for some time and unnecessarily seize the central control, crosspoints, junctors and dial pulse receivers. According to the invention, the subscriber is disconnected after the first unsuccessful starting process. Then, when the loop current changes, the central control is formed if a subscriber who is not dialling restores his handset.

Figure 2:
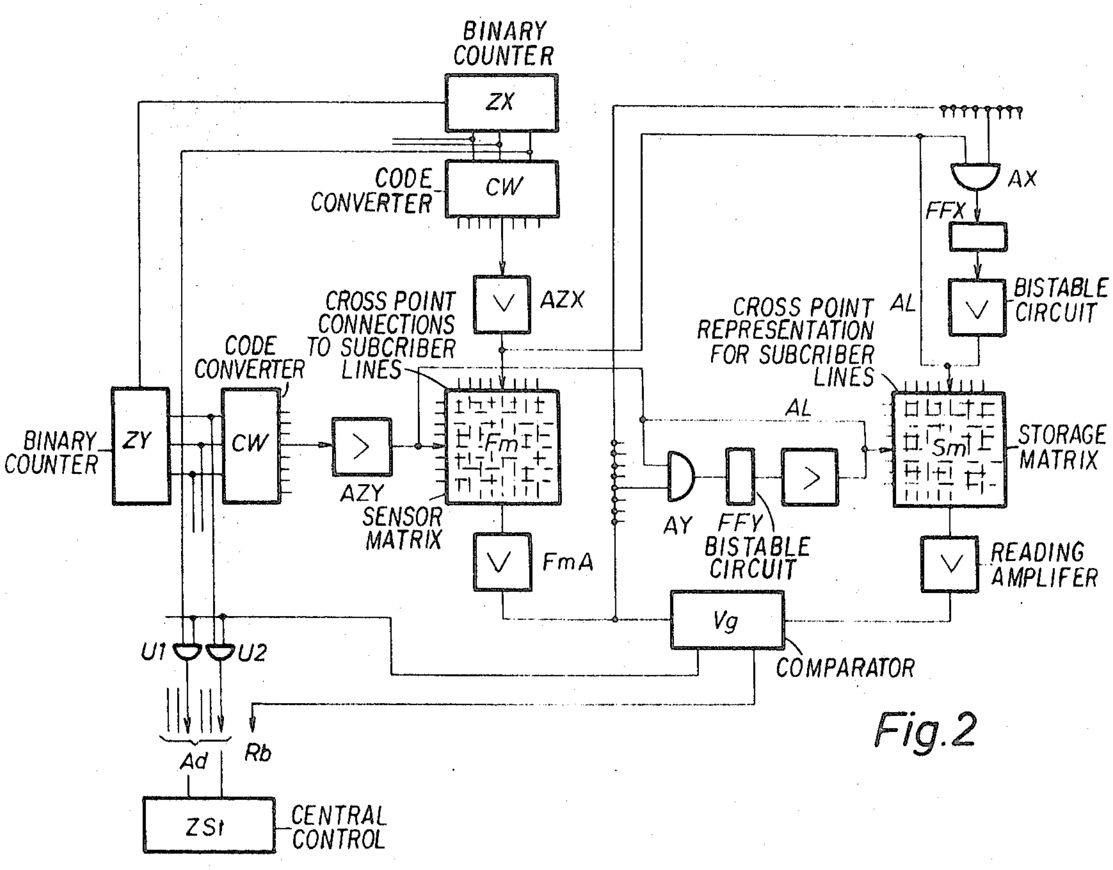

The above-mentioned and other features and objects of this invention and the manner of obtaining them will become more apparent, and the invention itself will be best understood by reference to the following description of an embodiment of the invention taken in conjunction with the accompanying drawings, in which:

FIG. 1 is a block diagram which serves to explain the known or prior art "last look" method, and FIG. 2 is another block diagram which shows the circuit arrangement according to the invention.

In FIG. 1, the subscriber stations T1*n* are associated with the subscriber line circuit TS. The speech wires are connected via the subscriber switching grid T*kf* to the junctors VS, and from there, to the directional grid R*kf*. The subscriber line circuits TS are cyclically scanned by the subscriber station scanners TS*c*1, TS*c*2. The loop condition found during scanning causes signals which are forwarded to the central control ZS*t*.

At each scanning controlled by a clock pulse T, of a subscriber circuit, the loop condition of that subscriber circuit is interrogated and the condition prevailing during the previous scanning is simultaneously read from the storage LL via a storage scanner SS*c*. In the central control ZS*t*, the present result is compared with the previous scanning result. If no change has occurred the central control waits for further scannings until a change is reported. If such a change has occurred, the central control initiates the required control measures. For example, a connection may be established from the scanned subscriber circuit to a register Reg. After each reading of the previous scanning result, the scanning result at hand is written into the storage LL. Advantageously, the storage LL may be combined with other central storages, such as an identification translator KzO. The described scanning principle is also known as the "last look" method.

According to the invention the following essential parts of the scanning means (FIG. 2) are common to a group of scanned items: a sensor matrix F*m*, a storage matrix S*m*, and a comparing unit V*g*. These means are decentralized in that they work with a relatively small group of subscriber line circuits (such as 64). Therefore, the term "decentralized detector" may aptly describe the arrangement. In the sensor matrix F*m*, the matrix points associated with the subscriber circuits, are cyclically scanned under the control of the respective three digit binary counters ZX and ZY and their respective converters CW and amplifiers AZX and AZY. The output from the respective amplifiers AZX and AZY is fed in multiple to the respective levels of both the sensor matrix F*m* and the storage matrix S*m*, the latter over the leads AL. These counters ZX and ZY control the scanning interrogation in any known manner.

The output of the respective amplifiers is also fed to the respective delay lines networks. The delay line networks such as FFX comprise an AND circuit AX, a bistable circuit FFX and an amplifier AZX. Another input to the AND circuits AX and AZ is connected to the output of the sensor matrix amplifier FMA to pass a signal to the delay networks. Synchronously with the scanning of the sensor matrix F*m*, the storage matrix S*m* is scanned via the scanning lines AL. The loop condition found during the previous scanning there marked. Thus, the loop condition at hand may then be stored, via delayed bistable circuits FFX, FFY, and amplifiers, in the scanned storage elements of the storage matrix S*m*. The information stored there is then available to the next following scanning. When writing loop conditions into the storage matrix S*m*, its reading amplifier R*a* is blocked. The delay can be made in a known way by the selection of a suitable clock rhythm.

The simultaneously present scanning result of the sensor matrix F*m* and of the storage matrix S*m* is fed into the comparing means V*g*. If there has been a change since the previous scanning, several AND circuits U1, U2...conduct responsive to an output of the comparing means V*g*. These AND circuits are inserted into the lines branching off the binary counters ZX,ZY and leading to the central control. Thus, the marked counter outputs are through connected to the central control. The central control receives a binary address A*d* of the scanned subscriber circuit for which a change has been detected. Via another wire, the direction of the change is indicated by a binary bit R*b* sent for the comparing means V*g*.

The following table shows an example for determining the scanned, stored and transmitted signals.

| Series | Process | Scanned Fm-signal | Scanned Sm-signal | New Sm-signal | Transmitted Rb |
|---|---|---|---|---|---|
| 1 | Non-operative condition, loop open | 0 | 0 | 0 | |
| | | 0 | 0 | 0 | |
| | | . | . | . | |
| | | . | . | . | |
| 2 | Subscriber lifts handset, loop closed | 1 | 0 | 1 | 1 |
| 3 | Subscriber is connected to register and dials, the sensor of Fm-is switched off | (1) | 1 | 0 | 0 |
| | | (0) | 0 | 0 | |
| | | (1) | 0 | 0 | |
| | | (0) | . | . | |
| | | (1) | . | . | |
| 3a | Subscriber does not dial (found out in the register) | (1) | 0 | 0 | |
| 4 | Release of connection, drop-off to TS | (1) | 0 | 0 | |
| 5 | The sensor of Fm is switched on again | 1 | 0 | 1 | 1 |
| | | 1 | 1 | 1 | |
| | | 1 | 1 | 1 | |
| | | . | . | . | |
| | | . | . | . | |
| 6 | Subscriber restores handset | 0 | 1 | 0 | 0 |
| | | 0 | 0 | 0 | |
| | | 0 | 0 | 0 | |
| | | . | . | . | |
| | | . | . | . | |

In column 5 of the foregoing table the central control (after having dropped the subscriber to its own subscriber circuit) evaluates the directional bit 1 transmitted by said subscriber circuit as an acknowledging signal for the release and not as a request for a register.

If no change has been detected in the comparing means V*g*, which is frequently the case, no information reaches the central control. Thus, the operating speed of the central control can be made so that all changes reported from all groups can be processed successively. However, intermediate storages must precede the central control in order to successively process changes, simultaneously reported from different groups.

With a circuit arrangement corresponding to the one shown in FIG. 2, it is also possible to scan the junctors group by group, in order to consider with little additional expenditure requests for establishing connections, such as call back or conference calls.

While the principles of the invention have been described above in connection with specific apparatus and applications, it is to be understood that this description is made only by way of example and not as a limitation on the scope of the invention.

We claim:

1. In a central control switching system, a first matrix having connection to a plurality of subscribers lines, a second matrix having like representation for said plurality of subscribers lines, said second matrix including storage elements at each of said representations, scanning means having connection to both of said matrices for simultaneously interrogating both of said matrices, means responsive to one or more changes in condition at the lines connected to said first matrix for thereafter transmitting like indications of said changes to the representative storage elements of said second matrix to store indications of such changes, means connected to both said matrices and responsive to the simultaneous scan for comparing indications received from said both matrices and means responsive to a difference in said comparison for transmitting a signal of said change to a central control.

2. In a system as claimed in claim 1, wherein there are scan control means, and wherein said last mentioned transmitting means comprises a plurality of AND circuits, a first input to said AND circuits, connected to the output of said scan control means, and a second input to said AND circuits connected to the output of said comparing means.

3. In a system as claimed in claim 2, wherein a further connection is made to said central control from said comparing means in parallel with an AND circuit output for indicating the direction of change of said signal.